United States Patent
Williams et al.

(10) Patent No.: US 11,048,389 B2
(45) Date of Patent: Jun. 29, 2021

(54) CUSTOMIZABLE MULTI-FUNCTION DISPLAY

(71) Applicant: Mid-Continent Instrument Co., Inc., Wichita, KS (US)

(72) Inventors: Brett Alan Williams, Wichita, KS (US); Cary Allen Shoup, Wichita, KS (US)

(73) Assignee: Mid-Continent Instrument Co., Inc., Wichita, KS (US)

( * ) Notice: Subject to any disclaimer, the term of this patent is extended or adjusted under 35 U.S.C. 154(b) by 0 days.

(21) Appl. No.: 16/571,490

(22) Filed: Sep. 16, 2019

(65) Prior Publication Data

US 2021/0081085 A1   Mar. 18, 2021

(51) Int. Cl.
*G06F 3/0484* (2013.01)
*G06F 3/0482* (2013.01)
*B64D 45/00* (2006.01)
*B64D 43/02* (2006.01)
*B64D 45/02* (2006.01)

(52) U.S. Cl.
CPC .......... *G06F 3/0484* (2013.01); *B64D 45/00* (2013.01); *G06F 3/0482* (2013.01); *B64D 43/02* (2013.01); *B64D 2045/0065* (2013.01)

(58) Field of Classification Search
CPC ..... G06F 3/0482; G06F 3/0484; B64D 43/02; B64D 45/00; B64D 2045/0065
See application file for complete search history.

(56) References Cited

U.S. PATENT DOCUMENTS

| | | | | |
|---|---|---|---|---|
| 5,270,931 A | * | 12/1993 | Appleford | G05B 19/0426 365/228 |
| 5,416,705 A | * | 5/1995 | Barnett | G01C 23/00 340/10.42 |
| 6,401,013 B1 | * | 6/2002 | McElreath | G01C 23/005 244/1 R |
| 7,386,374 B1 | * | 6/2008 | Orf | G01C 25/00 340/973 |

(Continued)

OTHER PUBLICATIONS

Integrated Modular Avionics (IMA) Development Guidance and Certification Considerations, RTCA DO-297, Nov. 8, 2005, RTCA, Inc. (69 pages) (Year: 2005).*

(Continued)

*Primary Examiner* — Eric J. Bycer
(74) *Attorney, Agent, or Firm* — Erise IP, P.A.

(57) ABSTRACT

A multi-function display system is configured to allow customization of inputs, outputs, and a display to an aircraft or other vehicle. The multi-function display provides custom outputs and a custom display by utilizing a configuration file, while maintaining the initial certification basis of the product hardware and software. The multi-function display is configured to receive a configuration file from a user via the communications element, wherein the configuration file includes information that defines the custom outputs; receive, during flight mode and from a sensor, a first parameter; access, during flight mode, the configuration file; perform, during flight mode, a data function on the first parameter; calculate, during flight mode, an output function based upon the data function and the configuration file; and provide, during flight mode, the output on the display or to another computing device.

20 Claims, 8 Drawing Sheets

(56) References Cited

U.S. PATENT DOCUMENTS

| | | | | |
|---|---|---|---|---|
| 8,255,095 B2* | 8/2012 | Girlich | G05B 19/0421 | 701/3 |
| 8,633,913 B1* | 1/2014 | Raghu | G06F 3/0416 | 345/173 |
| 9,036,800 B2* | 5/2015 | Cai | H04M 15/8038 | 379/201.02 |
| 9,284,045 B1* | 3/2016 | Springer | B64D 43/00 | |
| 9,523,985 B1* | 12/2016 | Barnes | B64D 43/00 | |
| 9,714,081 B1* | 7/2017 | Hall, III | B64C 19/00 | |
| 10,706,727 B1* | 7/2020 | Trapani | G08G 5/0013 | |
| 2003/0038844 A1* | 2/2003 | Royalty | G06F 3/14 | 715/781 |
| 2005/0066285 A1* | 3/2005 | Santori | G06F 8/34 | 715/763 |
| 2007/0006101 A1* | 1/2007 | Michaels | B63J 99/00 | 715/866 |
| 2007/0021893 A1* | 1/2007 | Ikeda | B60R 16/037 | 701/49 |
| 2007/0069880 A1* | 3/2007 | Best | B60K 37/02 | 340/461 |
| 2007/0130437 A1* | 6/2007 | Larson | G08G 5/00 | 711/165 |
| 2007/0143662 A1* | 6/2007 | Carlson | G06F 9/451 | 715/207 |
| 2008/0163201 A1* | 7/2008 | Jogand-Coulomb | G06F 9/441 | 717/178 |
| 2008/0246633 A1* | 10/2008 | Pouzolz | G01D 3/10 | 340/971 |
| 2009/0198392 A1* | 8/2009 | Eicke | G01C 23/005 | 701/3 |
| 2009/0240840 A1* | 9/2009 | Habben | G05B 19/0426 | 710/10 |
| 2010/0161157 A1* | 6/2010 | Guilley | G05B 23/0272 | 701/3 |
| 2012/0036220 A1* | 2/2012 | Dare | H04L 67/04 | 709/217 |
| 2012/0084399 A1* | 4/2012 | Scharber | H04L 67/34 | 709/219 |
| 2012/0233495 A1* | 9/2012 | Einig | H04L 67/303 | 714/4.5 |
| 2013/0305391 A1* | 11/2013 | Haukom | G06F 21/84 | 726/29 |
| 2015/0019862 A1* | 1/2015 | Uczekaj | G06F 21/71 | 713/155 |
| 2015/0066285 A1* | 3/2015 | Albouy | G06Q 10/20 | 701/29.3 |
| 2015/0207805 A1* | 7/2015 | Blair | G06F 21/53 | 713/176 |
| 2016/0163202 A1* | 6/2016 | Marion | G08G 5/0021 | 701/3 |
| 2017/0186328 A1* | 6/2017 | Beernaert | B64D 45/00 | |
| 2017/0242910 A1* | 8/2017 | Hochwarth | H04B 7/18506 | |
| 2017/0251501 A1* | 8/2017 | Batsakes | B64D 43/00 | |
| 2019/0102051 A1* | 4/2019 | Lattore Costa | G06F 9/4415 | |
| 2019/0180530 A1* | 6/2019 | True | B64D 43/00 | |
| 2020/0348148 A1* | 11/2020 | B | B64D 45/00 | |

OTHER PUBLICATIONS

U.S. Department of Transportation, Federal Aviation Administration, Advisory Circular 120-76D—Authorization for Use of Electronic Flight Bags, Oct. 27, 2017 (30 pages) (Year: 2017).*

U.S. Department of Transportation, Federal Aviation Administration, Advisory Circular 20-170 (Change 1)—Integrated Modular Avionics Development, Verification, Integration, and Approval Using RTCA/DO-297 and Technical Standard Order-C153, Oct. 28, 2010 and Nov. 21, 2013 (41 pages) (Year: 2013).*

U.S. Department of Transportation, Federal Aviation Administration, Advisory Circular 20-173—Installation of Electronic Flight Bag Components, Sep. 27, 2011 (11 pages) (Year: 2011).*

* cited by examiner

CUSTOMIZABLE MULTI-FUNCTION DISPLAY

BACKGROUND

1. Field

Embodiments of the invention are broadly directed to display devices in vehicles. More specifically, embodiments of the invention are broadly directed to customizable multi-function displays in aircraft.

2. Related Art

The operation of aircraft and other vehicles produces much information which the pilot (or other operator) must monitor. This information is provided to the pilot (or other operator) via numerous displays and gauges. The pilot observes these displays during operation of the aircraft so as be aware of the current status of the aircraft, take necessary corrective action, and make other informed decisions on the operation of the aircraft.

For safety reasons, the software which runs the displays and other computing devices in aircraft must be certified by the Federal Aviation Administration in the United States, or by other administrative or regulatory organizations. These certification processes are time consuming and expensive. Thus, in prior art systems, the article has no, or very limited, ability to be modified with respect to the information that is generated or displayed. If an installation requires different inputs, outputs and visual presentation, new hardware or software would be needed which would require independent certification. This is time- and cost-prohibitive for manufacturers and consumers. What is lacking in the prior art is a multi-function display that retains the certified hardware and software while allowing customization of the inputs, outputs and visual presentation.

SUMMARY

Embodiments of the invention solve the above-mentioned problems by providing a multi-function display that retains the certified hardware and software while allowing customization of the inputs, outputs and visual presentation. The customization is made via a configuration file that is static once installed. The multi-function display of these embodiments utilizes a certified software to run the multi-function display, interpret and analyze sensor readings, and display (or otherwise output) results. The multi-function display accesses a (in embodiments, non-certified) configuration file that dictates the output of the results, such as displaying on the included display or sending data to another aircraft computing device. Thus, a configuration file can be requested, encompassing the requirements of the application, that customizes the values produced and how they are displayed or provided.

A first embodiment of the invention is directed to a multi-function display system configured to provide a custom display to a pilot, comprising a display, a communications element, and a processor. The processor is configured to receive a configuration file from a user via the communications element, wherein the configuration file includes information indicative of the custom display. The processor is further configured to receive, during a flight mode and from a sensor, a first parameter. The processor is further configured to access, during flight mode, the configuration file. The processor is further configured to perform, during flight mode, a data function on the first parameter. The processor is further configured to calculate, during flight mode, an output function based upon the data function and the configuration file. The processor is further configured to display, during flight mode, the output function on the display so as to present said custom display from the configuration file, or otherwise provide the output function to another computing device.

A second embodiment of the invention is directed to a multi-function display system, comprising a display, a communications element, a processor, and a non-transitory computer readable storage medium. The computer readable storage medium has a computer program stored thereon to provide a custom display to the pilot, wherein the computer program instructs the processor to perform the following steps: receiving a configuration file from a user via the communications element, wherein the configuration file includes information indicative of the custom display; receiving, during a flight mode and from a sensor, a first parameter; accessing, during flight mode, the configuration file; perform, during flight mode, a data function on the first parameter; calculating, during flight mode, an output function based upon the data function and the configuration file; and displaying, during flight mode, the output function on the display so as to present said custom display from the configuration file.

A third embodiment of the invention is directed to a multi-function display system configured to provide a custom display to a pilot, comprising a display, a communications element, an intermittent digital port, and a processor. The intermittent digital port is configured to receive a portable-storage device. The processor is configured to receive a configuration file from a user via the intermittent digital port, wherein the configuration file includes information indicative of the custom display. The processor is further configured to receive, during a flight mode and from a sensor, a first parameter. The processor is further configured to access, during flight mode, the configuration file. The processor is further configured to perform, during flight mode, a data function on the first parameter. The processor is further configured to calculate, during flight mode, an output function based upon the data function and the configuration file. The processor is further configured to display, during flight mode, the output function on the display so as to present said custom display from the configuration file.

Further embodiments of the invention may be directed to a non-transitory computer readable medium having a computer program stored thereon for performing flight mode operations and configuration mode operation. The computer program instructs at least one processing element to perform the steps of a computerized method.

Still further embodiments may be directed to a computerized method of performing the steps discussed herein.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWINGS

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

Overview

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etcetera described in one embodiment may also be included in other embodiments, but is not necessarily included. Thus, the invention can include a variety of combinations and/or integrations of the embodiments described herein.

The invention may comprise computing devices, servers, database, and communications networks to facilitate the functions and features described herein. The computing devices and servers may comprise any number and combination of processors, controllers, integrated circuits, programmable logic devices, or other data and signal processing devices for carrying out the functions described herein, and may additionally comprise one or more memory storage devices, transmitters, receivers, and/or communication busses for communicating with the various devices of the system. In various embodiments of the invention, the computing devices may comprise a memory element, a communication component, a display, a user interface, and a printer.

In embodiments of the invention, the computing devices and/or databases may implement the computer program and/or code segments of the computer program to perform some of the functions described herein. The computer program may comprise a listing of executable instructions for implementing logical functions in the user device. The computer program may be embodied in any computer readable medium for use by or in connection with an instruction execution system, apparatus, or device, and execute the instructions. In the context of this application, a "computer readable medium" may be any means that may contain, store, communicate, propagate, or transport the program for use by or in connection with the instruction execution system, apparatus, or device. The computer readable medium may be, for example, but not limited to, an electronic, magnetic, optical, electro-magnetic, infrared, or semiconductor system, apparatus, device or propagation medium. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM), and combinations thereof. The various actions and calculations described herein as being performed by or using the computer program may actually be performed by one or more computers, processors, or other computational devices, such as the exemplary device described herein, independently or cooperatively executing portions of the computer program.

It should be appreciated that while the following disclosure refers to aircraft, embodiments of the invention may be utilized with other types of vehicles. In some exemplary embodiments of the invention, a multi-function display interacts with a boat, a spacecraft, a missile, an automobile, a locomotive, or other vehicle. It should therefore be noted that throughout the description, "aircraft" could be replaced with "boat," "spacecraft," "automobile," "locomotive," "vehicle," or the like; and "pilot" could be replaced with "sailor," "captain," "helmsman," "astronaut," "driver," "engineer," or the like. In some embodiments, such as with an unmanned aerial vehicle, the "pilot" may be remote from the vehicle, such that the multi-function display is showing information about a vehicle that is remote from the multi-function display.

Example Hardware

Before discussing the functionality of the multi-function display, an exemplary hardware of some embodiments of the invention will be discussed. External views are provided in FIGS. 1-5. Various internal components are shown schematically for clarity in FIG. 6. The multi-function display is operable to provide display functionality to the aircraft. The multi-function display may be configured in a variety of ways. In embodiments of the invention, the multi-function display is configured to perform numerous functions and to interchangeably switch between functions as desired by the pilot. In the following description, a referenced component, such as the multi-function display, may refer to one or more entities. Therefore, reference may be made herein to a single entity (e.g., the multi-function display) or multiple entities (e.g., the multi-function displays, the plurality of multi-function displays, etc.) using the same reference number. Further, reference made to performance by a single entity may be performed by multiple entities individually or in concert.

Figure 3:
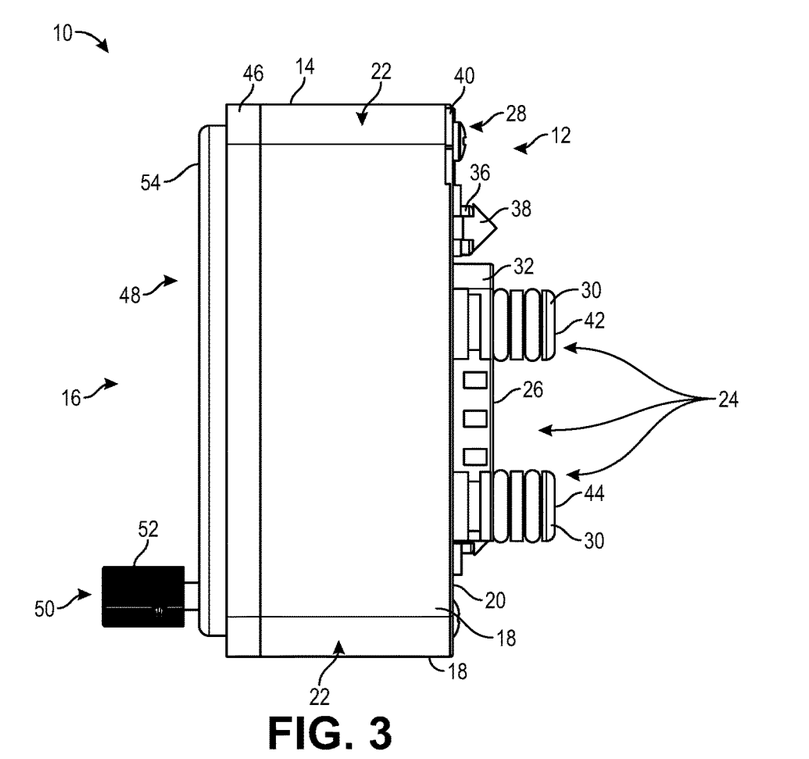
FIG. 3 is a side view of the first embodiment of the multi-function display.
Figure 4:
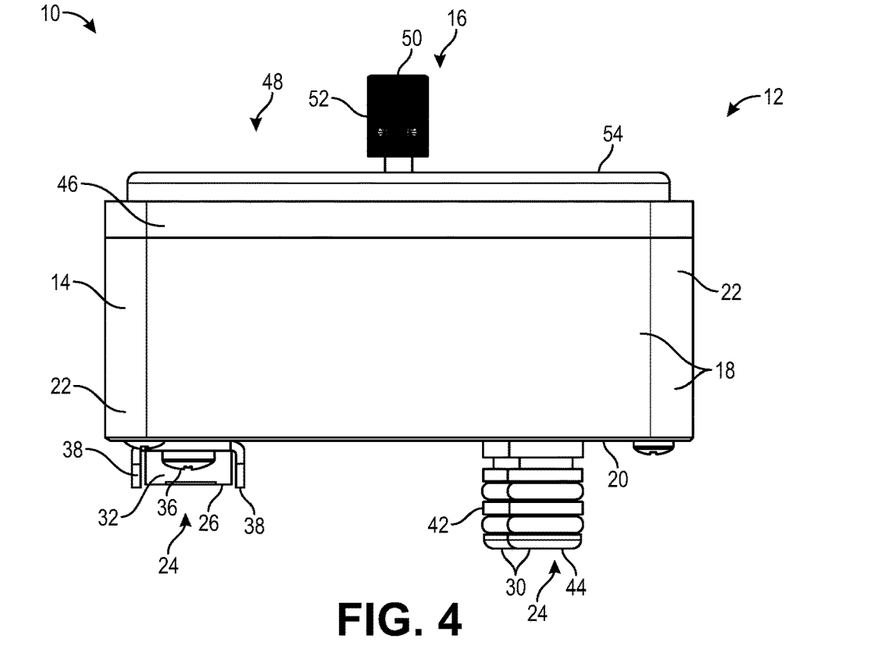
FIG. 4 is a top view of the first embodiment of the multi-function display.
Figure 5:
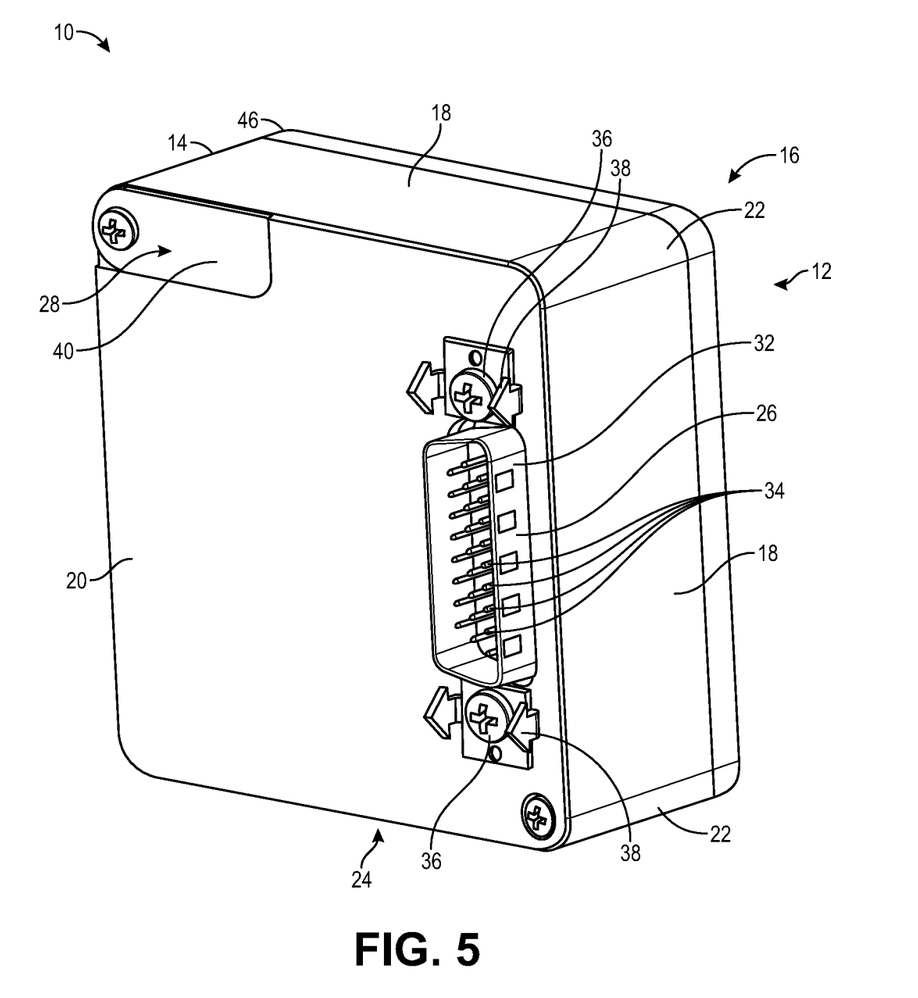
FIG. 5 is a perspective view a second embodiment of the multi-function display from a back side.

Turning to the figures, embodiments of the invention are directed to a multi-function display 10 including a housing 12. A first exemplary embodiment of the housing 12 is illustrated in FIGS. 1-4. A second exemplary embodiment of the housing 12 is illustrated in FIG. 5. In embodiments of the invention, the housing 12 generally comprises a body 14 and a face 16 and presents a generally rectangular prism shape. The body 14 secures various circuit boards, sensors, and other components therein (as discussed below and illustrated schematically in FIG. 6). The face 16 invites the user to input information and displays information to the user. Typically, the housing 12 will be installed into the aircraft such that the body 14 is at least partially concealed and the face 16 is visible. In some embodiments of the invention, the face 16 is formed of a polymer such as plastic and the body 14 is at least partially formed of metal.

Figure 1:
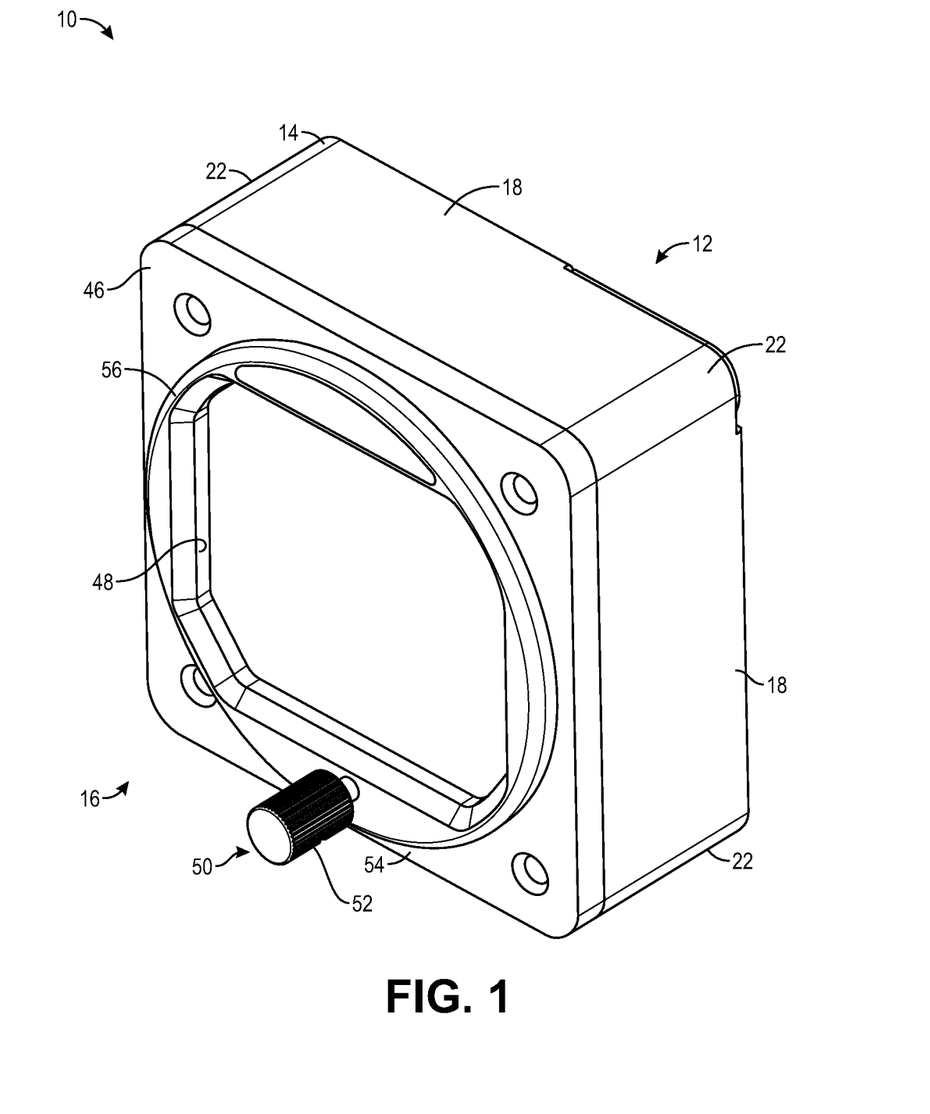
FIG. 1 is a perspective view of a first embodiment of a multi-function display, from a front side.
Figure 2:
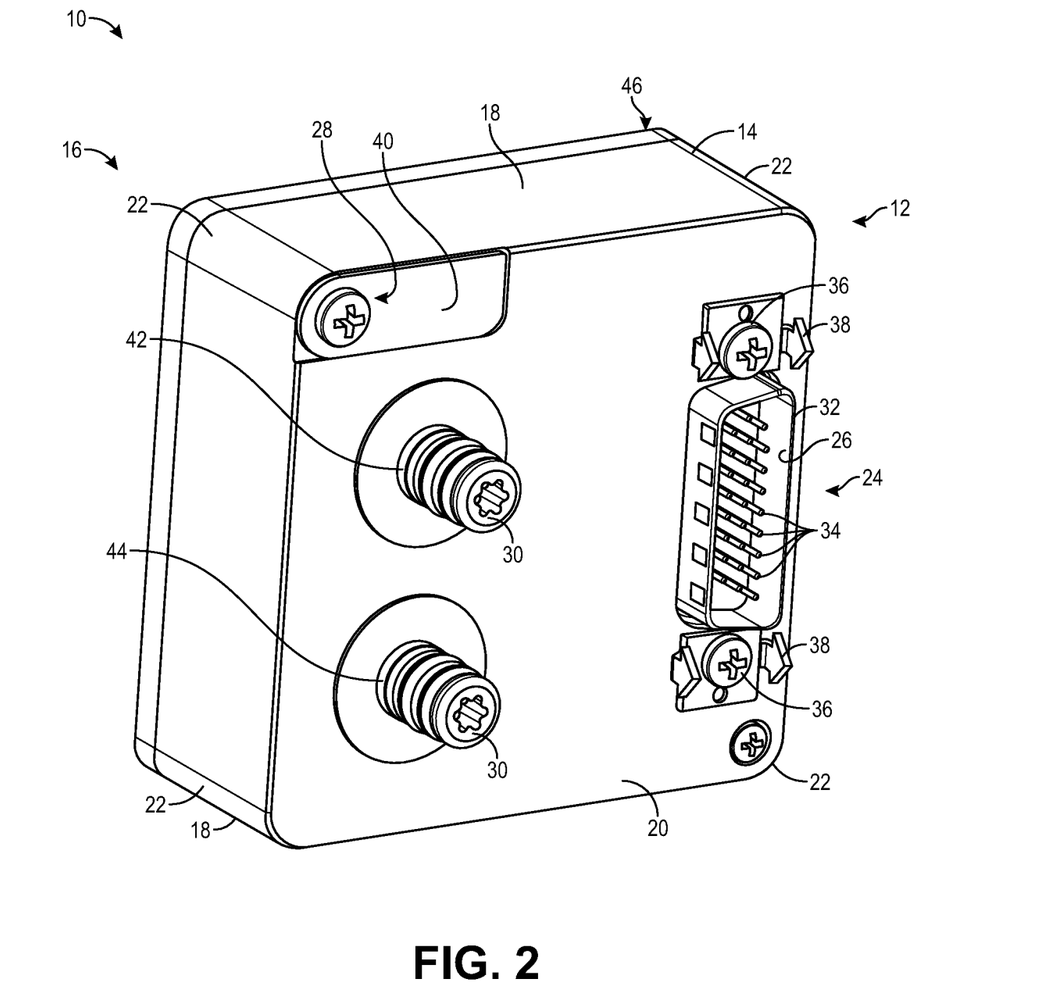
FIG. 2 is a perspective view of the first embodiment of the multi-function display of FIG. 1 from a back side.

In embodiments of the invention, the body 14 comprises four sidewalls 18 and a base 20. The four sidewalls 18 each protrude forward (e.g., toward the user) from the base 20. The four sidewalls 18 are each secured to the base 20 and to other adjacent sidewalls 18 so as to form a cavity. In some embodiments, the sidewalls 18 and the base 20 are unitary. The cavity is configured to receive the various electronic components of the multi-function display 10 as discussed below. The cavity is not directly illustrated. In embodiments, the sidewalls 18 intersect at a rounded corner 22, as best illustrated in FIGS. 1 and 2. In other embodiments, the sidewalls 18 interact at an arcuate, beveled, or right-angle intersection.

As best shown in FIGS. 2 and 5, in embodiments of the invention, a reverse side of the base 20 of the housing 12 includes one or more source inputs 24. Source inputs 24 provide information indicative of various sensors, electrical signals, digital information, analog information, or other indicia. A first embodiment, shown in FIGS. 2-4, includes a permanent digital port 26, an intermittent digital port 28 (shown covered), and a set of sensor ports 30. A second embodiment, shown in FIG. 5, include the permanent digital port 26 and the intermittent digital port 28.

The permanent digital port 26 provides a physical connection to a vehicle area network ("VAN") of the aircraft (or other vehicle). The permanent digital port 26 is configured to receive a permanent digital cable of the aircraft. Thus, the permanent digital port 26 provides for digital communication between the multi-function display 10 and the other computer components of the aircraft on the VAN. In the example shown in FIGS. 2-5, the permanent digital port 26 is a 26-pin RS-232 connection (commonly known as a "serial port"), specifically an HD 26-pin D-Sub. A serial port, as an embodiment of the permanent digital port 26, is configured to receive an RS-232 cable. The permanent digital port 26 of these embodiments may present a gasket protrusion 32 and a set of pins 34 protruding from the base 20. The permanent digital cable (e.g., the serial cable, not illustrated) fits within the gasket protrusion 32 and around the set of pins 34 so as electronically connect to the permanent digital cable. The permanent digital port 26 may include securing fasteners 36 and alignment protrusions 38 for keeping the permanent digital cable secured and aligned thereon. It should be appreciated that other embodiments may utilize other types of digital connections.

The permanent digital port 26 may utilize any sort of data transfer protocol. The example shown in FIGS. 2-5 utilizes ARINC 429, which is the technical standard developed by Aeronautical Radio Inc. (ARINC). It is an avionics data bus that defines physical and electrical interfaces and a data protocol to support the VAN of the aircraft. ARINC 429 uses a self-clocking and self-synchronizing data bus protocol. It should be appreciated that other embodiments may utilize other types of data transfer protocols.

The intermittent digital port 28 is configured to selectively receive an external data source. The intermittent digital port 28 is configured to be connected during transfer of a configuration file (discussed below), updating software, or other intermittent functions. For example, an operator may utilize the intermittent digital port 28 when adding a new configuration file to the multi-function display 10. The operator may insert a portable-storage device (not shown) into the intermittent digital port 28, upload the new configuration file, and remove the portable-storage device. A portable-storage device may be a Universal Serial Bus ("USB") flash drive, a SECURE DIGITAL® ("SD") device, a Compact Flash device, a floppy disc, a proprietary memory device, or other portable memory. In other embodiments, the intermittent digital port 28 may be a wireless communications element. In these embodiments, the updating of the configuration file may be performed wirelessly over BLUETOOTH, Wi-fi, mobile broadband, or some other wireless protocol.

Because the intermittent digital port 28 is empty during normal flight operations, a cover 40 may be provided over the intermittent digital port 28 to prevent dust accumulation in and damage to the intermittent digital port 28. The cover 40 may pivot relative to the body 14 or be removable fastened to the body 14. Thus, the pilot or other person may remove the cover 40, insert a portable-storage device or other memory or cable, upload the new configuration file, remove the portable-storage device, and replace the cover 40 over the intermittent digital port 28.

The sensor ports 30 are directly connected to one or more sensors of the aircraft that are external to the multi-function display 10. Two exemplary sensor ports 30 are shown in FIG. 2-4. The sensor ports 30 may be analog (as shown in FIGS. 2-4) or digital. The two exemplary sensor ports 30 include a static port 42 and a pitot port 44. The static port 42 and the pitot port 44 are fluidly connected to a pitot probe of the aircraft. A pitot probe extends from the aircraft and is used to measure airspeed of the aircraft by comparing a static air pressure to a total air pressure. The pitot port 44 and the static port 42 are disposed on the multi-function display 10 so as to allow the multi-function display 10 to directly receive and process the information. In some embodiments, the multi-function display 10 may directly measure the pressure of the respective ports. In other embodiments, the multi-function display 10 may receive the measured pressure from another computing device. In other embodiments, any of other numerous types of analog or digital sensors may be input into the multi-function display 10. In some embodiments, sensor ports 30 may be disposed on the multi-function display 10 that are not directly utilized during the installation. For example, in aircraft in which multiple multi-function displays 10 are used, the multi-function displays 10 may be identical or similar while the sensor ports 30 are only used once for each of the multi-function displays 10.

In other embodiments, additional or alternative ports may be present. For example, a digital sensor port (not illustrated) may be present which directly interacts with a sensor of the aircraft. In other embodiments, the additional or alternative port could be a display-to-display port for sharing information across multiple multi-function displays 10, such that the multi-function displays 10 are configured to share information such as sensors readings.

In other embodiments, such as those shown in FIG. 5, there are no sensor ports 30. In these embodiments, all of the source information utilized by the multi-function display 10 is acquired via the permanent digital port 26. It should be appreciated that some aircraft will utilize multiple multi-function displays 10 and that some will include sensor ports 30 and some will not. It should also be appreciated that in embodiments, the sensor ports 30 may be present on the multi-function display 10 but not be utilized. For example, the aircraft may include multiple multi-function displays 10 to which analog sensor cables (or other inputs) may be selectively added to perform a certain function. As a more specific example, in the multi-function display 10 is going to be utilized to show airspeed, the static and pitot tube inputs will be secured to the static port 42 and pitot port 44, respectively. If the multi-function display 10 is going to be utilized for some other function, the static and pitot tubes may be moved to another multi-function display 10 or to another computing device of the aircraft.

In embodiments of the invention, returning to FIG. 1, the face 16 comprises a face plate 46, a display 48, and at least one input 50. The face plate 46 encloses a pilot-facing side of the housing 12 and secures the display 48 and the input 50. The display 48 shows information in accordance with the configuration file, the acquired sensor information, and other information (as discussed in depth below). The display 48 may also display information related to the inputs 50 being selected by the pilot or other person. The inputs 50 may include buttons, dials, and the like. The input 50 as shown in FIG. 1 includes a dial 52. The dial 52 is used, as discussed below, to enter a configuration mode or to select which type of display to show on the multi-function display 10. In some embodiments, the input may include the display 48, being a touchscreen.

The face plate 46 is configured to be secured to the body 14 once the other components are secured within the body 14. The face plate 46 may be secured to the body 14 by one or more fasteners. The fasteners may be selectively removable or may be permanently secured. In FIG. 1, there are four fasteners illustrated keeping the face plate 46 secured to and aligned with the body 14. In other embodiments, the face plate 46 may be secured to the body 14 via clips, chemical adhesives, other structures. The face plate 46 may be selectively removable or permanently installed.

In embodiments of the invention, the face plate 46 presents a raised central section 54. The raised central section 54, as shown in FIG. 1, may include an annular protrusion 56 surrounding the display 48. The annular protrusion 56 extends forward (e.g., toward the pilot). The display 48 may be inset therein. Specifically, the display 48 may be secured to the face plate 46 or secured to the body 14 and held adjacent to the face plate 46. The input 50 may be disposed on the raised central section 54, as shown in FIG. 1. The raised central section 54 may include arcuate corners.

In embodiments of the invention, the multi-function display 10 includes the display 48 to present information to a user of the multi-function display 10, as illustrated in FIG. 1 and discussed below. In embodiments, the display 48 may comprise an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display 48 may be backlit via a backlight such that it may be viewed in the dark or other low-light environments.

The input 50 of the multi-function display 10 may include buttons, dials, and other input structures. The input 50 allows the pilot or other person to set up the multi-function display 10, provide commands to the multi-function display 10, toggle between various display configurations, check the status of the multi-function display 10, and perform other functions as may be necessary. In some embodiments, the screen of the display 48 comprises a touch screen. For example, the touch screen may be a resistive touch screen, a surface acoustic wave touch screen, a capacitive touch screen, an infrared touch screen, optical imaging touch screens, dispersive signal touch screens, acoustic pulse recognition touch screens, combinations thereof, and the like.

Figure 6:
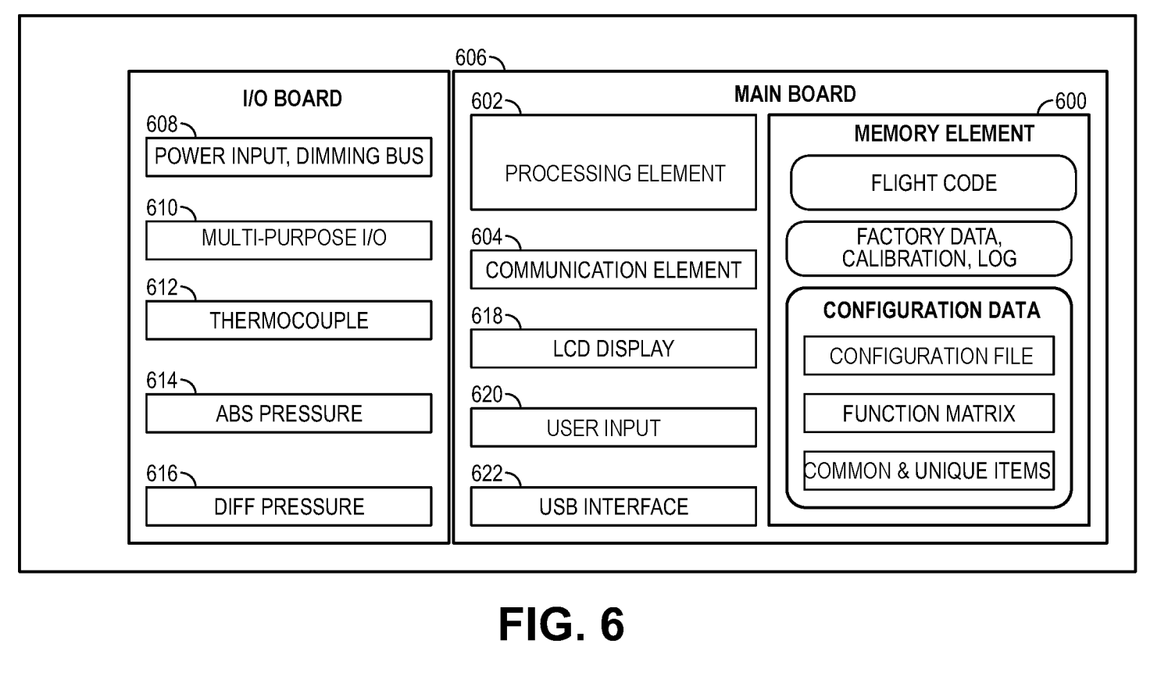
FIG. 6 is a hardware schematic showing various electronic components of the multi-function display.

Turning to FIG. 6, the other electronic components of the multi-function display 10 will now be discussed. These include a memory element 600, a processing element 602, and a communications element 604. These components are disposed on a main board 606 (such as a printed circuit board "PCB"). Other components, as shown on an I/O board in FIG. 6, may include a power input 608, a multi-purpose input/output interface 610 (such as the permanent digital port 26, serial/digital data (like RS-232, USB, and ARINC 429) and analog/discrete signals), a thermocouple 612, a static port interface 614, and a pitot port interface 616. Still other components may include the display interface 618, a user input interface 620, and an intermittent digital port interface 622.

The memory element 600 is an example of device-readable storage media that provides storage functionality to store various data associated with the operation of the multi-function display 10, such as the software program and code segments mentioned above, or other data to instruct the processor and other elements of the multi-function display 10 to perform the techniques described herein. For example, the memory element may include flight code, factory data, calibration information, log information, as well as configuration data such as the configuration file, the function matrices, and other common and unique items.

A wide variety of types and combinations of memory may be employed. For example, the memory element 600 may be an NVRAM Flash device. The memory may be integral with the processor, a stand-alone memory, or a combination of both. The memory element 600 may include, for example, removable and non-removable memory elements such as RAM, ROM, Flash (e.g., SD Card, mini-SD card, micro-SD Card), magnetic, optical, USB memory devices, and so forth. In embodiments of the multi-function display 10, the memory may include removable ICC (Integrated Circuit Card) memory such as provided by SIM (Subscriber Identity Module) cards, USIM (Universal Subscriber Identity Module) cards, UICC (Universal Integrated Circuit Cards), and so on. In other embodiments, there is only a single memory element 600 in the multi-function display 10. FIG. 6 illustrates one memory element 600 but more memory elements could also be utilized in the multi-function display 10.

The multi-function display 10 may also include a processing element 602. The processing element 602 provides processing functionality for the multi-function display 10 and may include any number of processors, micro-controllers, or other processing systems, and resident or external memory for storing data and other information accessed or generated by the multi-function display 10. The processing element 602 may execute one or more software programs that implement the techniques and modules described herein. The processing element 602 is not limited by the materials from which it is formed or the processing mechanisms employed therein and, as such, may be implemented via semiconductor(s) and/or transistors (e.g., electronic integrated circuits (ICs)), and so forth. It should also be appreciated that the discussed functions and methods performed by the processing element 602 of the multi-function display 10 may be performed by other processors. Similarly, the described structure of the processing element 602 may also describe corresponding structure on other processors.

The multi-function display 10 may also include a communications element 604 that is communicatively coupled to the permanent digital port 26. The communication element is representative of communication functionality to permit multi-function display 10 to send/receive data between different devices (e.g., components/peripherals) and/or over the one or more networks. The communications element 604 includes one or more Network Interface Units. NIU may be any form of wired or wireless network transceiver known in the art, including but not limited to networks configured for communications according to the following: one or more standards of Aeronautical Radio, Incorporated (ARINC) and the like. Wired communications are also contemplated such as through universal serial bus (USB), Ethernet, serial connections, and so forth. Multi-function display 10 may include multiple NIUs for connecting to different networks or a single NIU that can connect to each necessary network.

The communications element 604 may also have a wired and/or wireless connection to a vehicle-area network (VAN) for the aircraft in which it is used. Where such a vehicle-area network includes vehicle subsystem data such as the servos, the engine control unit, pilot interfaces, radios/satellites and other external communication devices, and aircraft controls, it may also be referred to as a Controller Area Network (CAN). VAN may include one or more integrated displays and/or speakers for the pilot in addition to the multi-function display 10. Alternatively, VAN may not integrate into the aircraft itself, but rather connect peripherals and other devices installed in or used in the aircraft. The VAN may also integrate with the vehicle control systems such that the communications element 604 can send control commands that will maneuver the aircraft.

In embodiments of the invention, the multi-function display 10 also includes power source. In some embodiments, power source is a source independent of the aircraft, such as batteries. In other embodiments, power source is an external power adapter receiving power from a vehicular power source providing AC or DC power and, if necessary, transforming it appropriately for use by multi-function display 10. As a non-limiting example, power source in such embodiments is a cable coupled with the multi-function display 10 and the vehicular power source to provide power to the device. In some such embodiments, this power is independent. In other embodiments, when multi-function display 10 is mounted in the aircraft, power source may provide power only when the aircraft is operating or otherwise powered on.

Example Method

The following discussion describes procedures that can be implemented in a multi-function display 10. The procedures can be implemented as operational flows in hardware, firmware, software, or a combination thereof. These operational flows are shown below as a set of blocks that specify operations performed by one or more devices and are not necessarily limited to the orders shown for performing the operations by the respective blocks. The features of the operational flows described below are platform-independent, meaning that the operations can be implemented on a variety of device platforms having a variety of processors.

Figure 7:
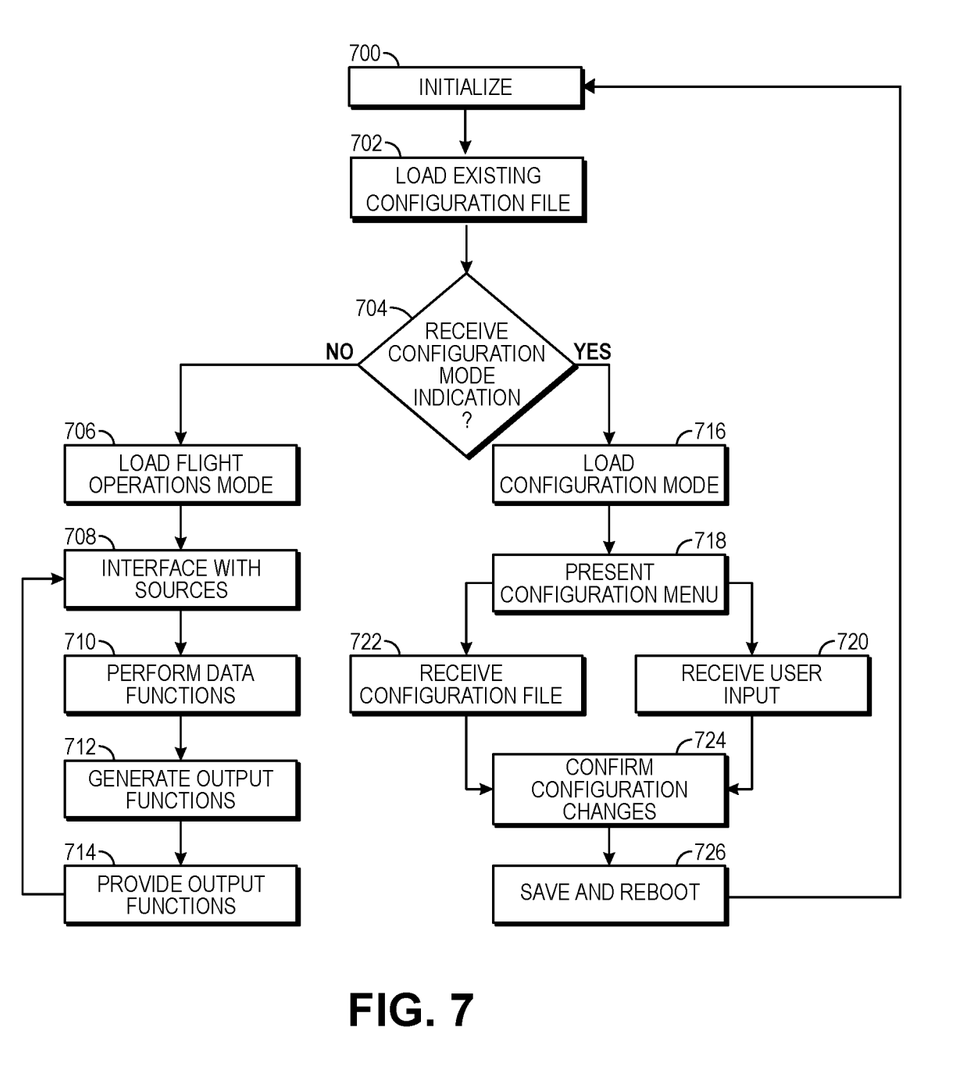
FIG. 7 is a flow diagram illustrating exemplary steps for performed by the multi-function display.

Turning to FIG. 7, at Step 700, the multi-function display 10 initializes upon power up or other initialization. Power up may be provided via power over the permanent digital port 26 (such as pin 1 on a standard ARINC 429 pin layout). Alternatively power up may be through an independent power cable (not illustrated). In other embodiments, power up may be initiated by the user pressing (or otherwise manipulating) the input 50 or other power switch (not illustrated) on the multi-function display 10. In these embodiments, the multi-function display 10 may be powered by an internal battery. In other embodiments, the power may be provided over the permanent digital port 26 (such as upon initial powering of the aircraft), but the multi-function display 10 will remain in a stand-by, non-initialized mode until instructed to initialize by another computing device of the aircraft.

Upon initializing, based upon receiving power or an initialization instruction as discussed above, the multi-function display 10 performs boot up functions and other initialization functions. These may include communication with external computing devices, interfacing with sensor, beginning internal processes, powering up internal devices such as the display 48, checking for internal errors, and other initialization processes.

In Step 702, the configuration file is loaded. In some embodiments, the multi-function display retains the certified hardware and software while allowing customization of the inputs, outputs, and visual presentation. The customization is made via the configuration file which is loaded onto the processor. The multi-function display accesses the (in embodiments, non-certified) configuration file that dictates the output of the results such as displaying on the included display or sending data to another aircraft computing device. The processor is configured to receive the configuration file from a user via the communications element, wherein the configuration file includes information indicative of the custom display.

In Step 704, the multi-function display 10 determines what mode to enter upon initialization. In embodiments, the multi-function display 10 has two or more options to enter: a flight mode and a configuration mode. The flight mode, as explained more below, is the standard function of the multi-function display 10 in reading or receiving sensor data (or other information) and displaying an output function in accordance with a configuration file. The configuration mode allows the pilot, administrator, or other person to set up the flight mode in any of various configurations.

In embodiments of the invention, the multi-function display 10 will enter flight mode by default and only enter configuration mode if specifically requested by the pilot or other user. For example, during initialization, the multi-function display 10 will enter flight mode if no other input is received during the initialization. However, if any of various inputs are received during the initialization, the multi-function display 10 will instead enter the configuration mode. This is because in common usage, the flight mode will be initiated most often for standard flight operations. The configuration mode will be utilized intermittently to set up the multi-function display 10 and to update the settings, add a new configuration file, update firmware or software, or perform other maintenance or upgrade functions.

In Step 706, the multi-function display 10 enters flight operations mode. As discussed above, in embodiments flight mode will be entered by default absent any other input. Upon entering flight operations mod, the multi-function display 10 will load and execute one or more computer programs stored on one or more non-volatile computer readable storage media.

It should be appreciated that in embodiments of the invention, the computer program executed by the multi-function display 10 in flight mode will be certified. For example, in the United States the computer program may be certified by the Federal Aviation Administration (FAA) or other administrative or regulatory body. Other nations and organizations may have other software certification processes and/or standards Certification of software in aircraft (and other vehicles) is performed to ensure that the software will function as desired under various conditions, as discussed above. Thus, as the software of the multi-function display 10 is being utilized on an aircraft, in embodiments, the software may be certified via a process by the FAA or other organization.

In Step 708, the multi-function display 10 interfaces with sources. Sources may be any of numerous sources of information that will be utilized in producing an output function, as discussed below. In some embodiments, the source is direct. A direct source is a sensor or other source which provides information (in either analog or digital form) directly to the multi-function display 10. For example, as shown in FIGS. 2-4, a sensor such as a pitot tube may be fed directly to the multi-function display 10 from the sensor. In some embodiments, the source is indirect. An indirect source is a computing device or other source which provides information to the multi-function display 10. The computing device may be directly or indirectly connected to other sensors and/or computing devices that are sources of information. Thus, the computing device is sending information indicative of sensor readings or other flight information. The computing devices may only send sensor readings and flight information as needed by the multi-function display 10, as requested by the multi-function display 10 In some embodiments, a combination of direct sources and indirect sources are utilized.

For illustrative purposes, various sources which may be utilized by the multi-function display 10, alone or in combination, are discussed below. Sources may be used alone or in combination with other sources, such as those discussed below or others. Sources may be acquired but not otherwise utilized by the multi-function display 10. For example, the configuration file, as discussed below, may provide multiple possible output functions which the pilot may select during flight mode. These multiple possible output functions may utilize various different sources, thus not all sources may be utilized at all times.

In Step 710, the multi-function display 10 performs data functions on the source information. The data functions are performed at least in part based upon the configuration file. The data functions perform various calculations, projections, interpolations, extrapolations, graphing, monitoring, and/or other functions on the source information. The flight mode executes one or more record functions in the configuration file. One or more data functions may be included in a record function, as discussed more below. The record functions instruct the data functions to be performed on the source information by the multi-function display 10. The record functions are discussed in more detail below in regards to FIG. 8.

In Step 712, the multi-function display 10 generates an output function based at least in part on the data function. The output function can include electrical outputs (such as data sent to another computing device) and/or visual outputs (such as displayed on the display of the multi-function display). The output function is information indicative of how the result of the various data functions will be displayed by the multi-function display 10 or otherwise utilized by another computing device.

In some embodiments, the multi-function display 10 will prepare the information to be displayed. For example, the output function will control how the results will be displayed. The output function may include information related to the location, size, font, and manner in which the information will be displayed to the user. The output function is also described in the configuration file. As discussed above, the flight mode may be a certified software while the configuration file is not. This provides the ability to customize the output functions without having to independently certify new software.

It should be appreciated that various results may be characterized and shown in any of various ways. Exemplary forms of output functions will now be discussed to provide examples of how various results of the data functions may be presented to the pilot (either on the multi-function display 10 or on another display of the aircraft). A first exemplary form is a numerical value. The numerical value could be expressed from as a current reading level of the sensor, or on a range of normal operation 0 to +100, such that 0 is the lowest normal operating rang and 100 is the highest normal operating range (intermediate values being in the range of 0 to 99). In yet other embodiments, the numerical value is a summation of factors with no theoretical maximum or theoretical minimum. A second exemplary form is graphical representation, such as a bar graph or chart. The graphical representation may give a current level, a history of past levels, a projected upcoming level, or other information about the value. A third exemplary form may be a color system in which red is problematic and worthy of attention and green is non-problematic and functioning normally (intermediate values being on the color spectrum between red and green). A fourth exemplary form may be a binary result, such as a simple pass/fail designation. The pass/fail designation definitely states whether the system believes the current value to be problematic or not. This may be based upon certain thresholds that may be fixed or variable. A fifth exemplary form may be an illustration. For example, the illustration may be a thermometer with the level of the thermometer approximating the current temperature of a certain aircraft component and an illustrated threshold below which the component is considered to be operating normally. As another example, the illustration may show an arrow corresponding to a certain direction, such as wind speed and direction. Additional forms may be used alone or in combination with the above-discussed forms. Multiple different forms may be shown simultaneously.

In Step 714, the multi-function display 10 provides the output function (or a graphical representation thereof) on the display 48. Based upon the output function determining the manner in which the results of the data functions will be displayed, the multi-function display 10 displays the results on the display 48 of the multi-function display 10. The output functions may be updated (such as continuously, automatically, and/or periodically) to reflect updated results of the data functions (such as based upon updated source information, more refined calculations, or other results).

In embodiments of the invention, the multi-function display 10 may additionally or alternatively send the output function to another computing device. The output function may then be displayed on the other computing device, utilized for another calculation, saved in a flight data recorder (such as a "black box" recorder) or other memory device, or utilized for some other function. Thus, the above described steps (or a portion thereof) may be performed on a device without any display as a component thereof. This device may then send the output function to a display device for display, or to another computing device for any of various other functions.

In Step 716, if the indication to enter the configuration mode was received, the multi-function display 10 enters the configuration mode. The indication may be received from the user in any of numerous ways. In some embodiments, the multi-function display 10 will enter configuration mode upon detecting that the user held (or otherwise manipulated) the input 50 during the initialization for a certain time threshold (for example, three seconds). In some embodiments, the multi-function display 10 will enter configuration mode upon detecting a connection in the intermittent digital port 28. In still other embodiments, the multi-function display 10 may include a configuration mode input (not illustrated) such that the user may select during initialization to enter configuration mode.

In Step 718, the multi-function display 10 presents a configuration menu on the display 48 via a graphical user interface. The configuration menu may present options to the user that allow the user to select various desired output functions for display 48 during flight mode. The output functions may be selected from the inherent software or firmware of the multi-function display 10 (for example, from certified software) or from the configuration file (for example, a non-certified data file that instructs an output function). The configuration menu may also allow the user to select various modes, configurations, display types, or other characteristics of the flight mode.

In Step 720, the multi-function display 10 receives user input regarding the configuration. The user may select the above discussed functions, such as by manipulating the input 50 on the multi-function display 10.

In Step 722, the multi-function display 10 receives a configuration file or other information from the intermittent digital port 28. After receiving the new configuration file, user input may be requested and received regarding the configuration file. In some embodiments, there is a single configuration file stored on the multi-function display 10. The single configuration file may have multiple record functions, selectable by the user. In other embodiments, there may be multiple configuration files stored on the multi-function display 10. Thus, the multi-function display 10 may receive additional or updated configuration files. The user input, in these embodiments, may include a user selection to utilize a certain configuration file in flight mode from a set of configuration files stored on the multi-function display 10.

It should be appreciated that during operation of the multi-function display 10, many different configuration files may be uploaded, altered, or added. Thus, in many instances, the multi-function display will receive a second configuration file from the user. The second configuration file includes information indicative of a second custom display. For example, the second custom display may change the parameters shown and/or the method or manner in which they are shown. Thus, the second custom display appears visibly distinct from said custom display. The first configuration file, that which was on the multi-function display 10 before the second configuration file was received may be discarded, deleted, or saved for possible future use. The multi-function display 10 may ship with a default configuration file that may be updated or changed by the end user to allow for the above-discussed customization.

In Step 724, multi-function display 10 confirms changes to the configuration based upon the configuration file, the user input, or both. The confirmed changes will be implemented by the multi-function display 10 when the multi-function display 10 returns to flight mode. In Step 726, the multi-function display 10 receives a selection from the user to return to flight mode. In some embodiments, the multi-function display 10 will return to at least a portion of the initialization. In other embodiment, the multi-function display 10 will move to flight mode from the configuration mode, as shown in FIG. 7. In other embodiments, the user may power off the multi-function display 10 and reboot the multi-function display 10 such that the initialization will begin and then enter flight mode.

Figure 8:
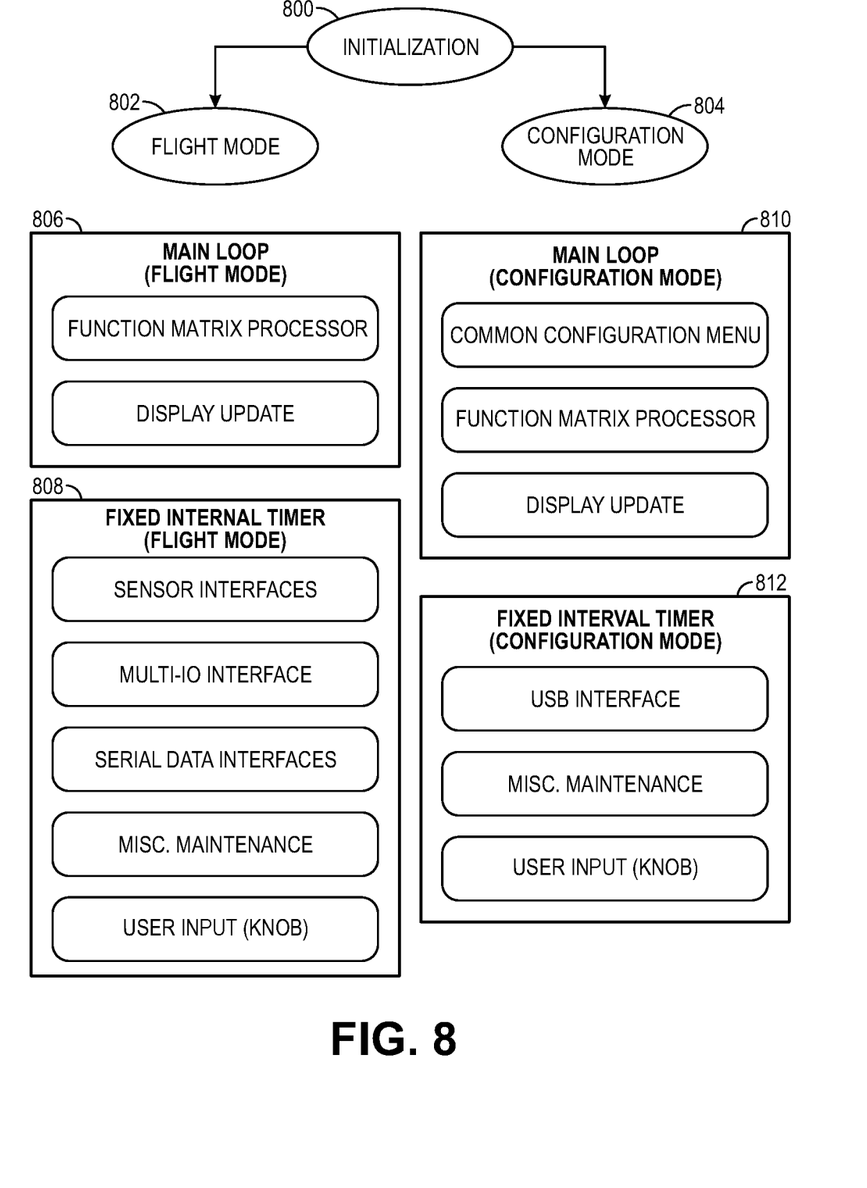
FIG. 8 is a software mode diagram illustrating a flight mode and a configuration mode utilized by the multi-function display.

Turning to FIG. 8, another visualization of the two modes is shown. At the top of FIG. 8, the initialization mode 800 begins with the multi-function display 10 entering either the flight mode 802 or the configuration mode 804 (as discussed above). Once in the respective modes, the multi-function display 10 stays in a main loop with a fixed interval timer associated therewith.

Figure 9:
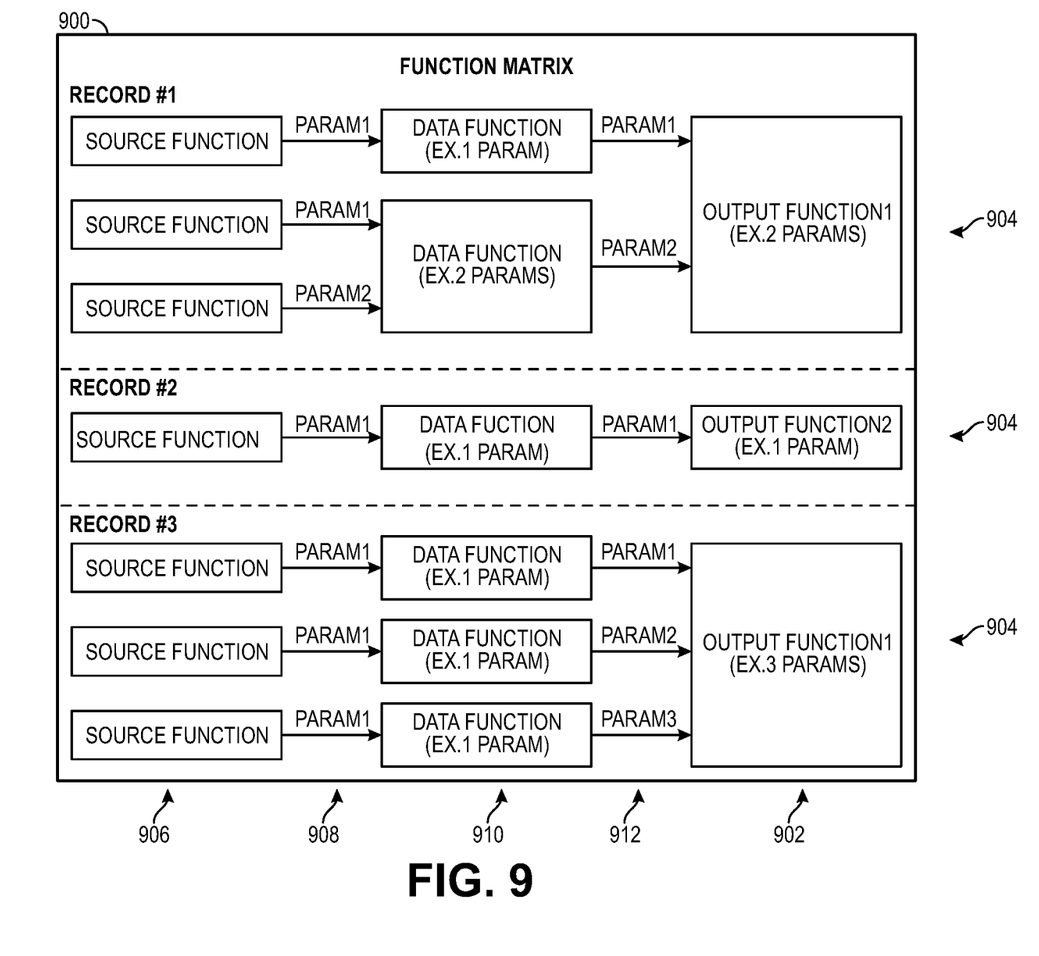
FIG. 9 is a flow diagram illustrating a function matrix utilized by the multi-function display.

In the main loop 806 of the flight mode, the multi-function display 10 runs the function matrix (an example of which is shown in FIG. 9) and then updates the display 48 to show the output function of the function matrix. The multi-function display 10 loops this function by running the function matrix and updating the display 48 accordingly. Thus, the function matrix continues to perform calculations on the data functions as new information is received during the fixed interval timer functions as discussed below. The display 48 is updated to reflect the output functions based upon the new calculations.

The fixed interval timer 808 of the flight mode is performed by the multi-function display 10 at certain intervals based upon various criteria (such as the ARINC 429 protocol, sensor readings, etc.). Examples of tasks performed during the fixed interval timer are sensor interfaces (such as via the sensor port), input/output interfaces (such as via the permanent digital port 26), serial data interfaces, user input, and other maintenance tasks. These functions are performed periodically alongside or among the main loop. The results of the fixed interval functions will affect the function matrix by providing new sensor readings or other data for the calculations and output functions performed.

In the main loop 810 of the configuration mode, the multi-function display 10 runs a common configuration menu and the updates the display 48 to show the common configuration menu. The fixed interval timer 812 of the configuration mode is performed by the multi-function display 10 at certain intervals based upon various criteria. Examples of tasks performed can include checking the intermittent digital port 28, checking for user input, and other maintenance tasks. As the user inputs information and makes selections, the common configuration menu updates and displays results on the display 48. Similarly, new configuration files may be received or requested via the intermittent digital port 28 (such as the USB port, which is shown covered in FIGS. 2-5). The new configuration file may be accessed and analyzed to provide additional options to the user on the common configuration menu. This may include at least partially running the function matrix so as to present options to the user on which record function to utilize, how to customize the display 48 of the record functions, and other options. For example, the user may select an option to have record function 1 and record function 3 displayed, with record function 1 displayed over record function 3 (see FIG. 9).

Turning to FIG. 9, yet another visualization of the steps performed by the multi-function display 10 is shown. FIG. 9 illustrates an exemplary function matrix 900. The function matrix is provided to the multi-function display 10 via the configuration file. Changes to the function matrix are made by uploading a new configuration file to the multi-function display 10 via the intermittent digital port 28. The function matrix is configured to produce one or more output functions. These output functions are displayed on the display 48 as discussed above. One or more output functions make up a record function. The record functions may be displayed alone or in combination with other record functions.

In embodiments of the invention, the flow of the function matrix is shown generally left-to-right on FIG. 9. Various source functions provide information to the multi-function display 10. As discussed above, these source functions may be direct or indirect. Further, these source functions are sampled or received according to the fixed interval timer during flight mode. One or more parameter from each source function is then provided to a data function. The data function may perform an analysis, a conversion, a calculation, an estimation, an interpolation, an extrapolation, a prediction, or some other function on the one or more parameters from the source functions. One or more parameters from the data functions are provided to the output functions. The output functions provide a graphical representation of the parameters provided from the data functions. The display 48 is then updated with the new output function during the main loop of the flight mode.

In embodiments, the configuration file is generated after the multi-function display 10 is already owned by the end user. The multi-function display 10 may be provided with an initial or default configuration file that may be overwritten, added to, amended, or otherwise changed for a new configuration file (generally, the multi-function display 10 may "receive" a configuration file). The new configuration file includes output functions that are customized to the operator. The configuration file may be a text file, an executable file, or other discrete computer file. As discussed above, because the configuration file is produced subsequently, and because the configuration file controls the manner in which the information is displayed (instead of the manner of generating the information), the configuration file is typically not certified software. The certified software that runs the multi-function display 10 accesses the configuration file to determine the manner of display.

The configuration file may be generated and/or received in any of numerous ways. In some instances, the operator may write the configuration file. In some instances, the operator may utilize a graphical user interface on another computing device to generate the configuration file. In some instances, the operator may describe the desired output function (such as to the manufacturer or other entity associated with the multi-function display 10) and have the configuration file prepared externally, then receive the configuration file (such as via e-mail or other electronic delivery method) for later upload.

It should be appreciated that, as with other steps discussed herein, the steps described herein are not necessarily in order: not all steps need be performed in all embodiments, steps may be performed in any order, some steps may be performed simultaneously, some steps may be performed more than once, etc.

Example Sources

There are numerous data sources from which the above-discussed source functions may draw information. Embodiments of the invention allow the operator to select among these sources as desired and customize the display and/or other output, while utilizing certified software on the aircraft. This provides customization not possible under prior art systems. As discussed above, these sources may be directly into the multi-function display 10 (such as via the static port 42 and the pitot port 44 shown in FIGS. 2-4) or be indirectly sent to the multi-function display 10 via another computing device of the aircraft.

As a first example, a source may be a pitot tube, as described above. The pitot tube provides a speed of the aircraft relative to the air. A pitot probe extends from the aircraft and is used to measure airspeed of the aircraft by comparing a static air pressure to a total air pressure. The pitot port 44 and the static port 42 are disposed on the multi-function display 10 so as to allow the multi-function display 10 to directly receive and process the information. In some embodiments, the multi-function display 10 may directly measure the pressure of the respective ports. In other embodiments, the multi-function display 10 may receive the measured pressure from another computing device.

As a second example, a source may be a thermocouple 612. A thermocouple is an electronic device that produces a voltage based upon a temperature differential. Thus, the temperature of various aircraft components, ambient air, or other objects may be measured. The voltage is measured and interpreted which is indicative of the temperature. The voltage may be utilized as a source function parameter, such that the temperature may be determined via the data function. The determined temperature will then be displayed to the user via the output function.

As a third example, a source may be a pressure gauge. A pressure gauge is a mechanical, electrical, or electromechanical device that measures the pressure of a fluid in contact therewith. The pressure gauge may be measuring the pressure of a liquid (such as fuel for the aircraft) or a gas (such as ambient air pressure or air pressure in a tire). The pressure gauge may have a sensor that reads and/or transmits the pressure to the multi-function display 10.

As a fourth example, a source may be a fuel level system. The determined fuel level is thereafter periodically or continuously updated so as to provide accurate and timely fuel level information to the pilot and the other aircraft systems. A fuel level is an estimation of the amount of fuel that is currently in the fuel system. The fuel level may be expressed in any of numerous ways. Exemplary expression of the fuel level can include volume (such as gallons or liters), weight (such as pounds or kilograms), distance remaining (such as miles, nautical miles, or kilometers), operating time remaining, operating time until a certain event (such as a safe return point), a percentage, a graphical representation, a color, a string, or other representation of the amount of fuel in the fuel system.

As a fifth example, a source may be a global positioning system ("GPS") device or other positional information. The GPS may provide information to the multi-function display 10 for use in various calculations. For example, the GPS may provide position stamps, time stamps, altitude stamps, orientation stamps, velocity stamps, and other information that may be utilized in calculating data functions. For example, the timestamps may be utilized to determine fuel consumption over time. As another example, altitude stamps may be used to refine the pitot reading.

As a sixth example, a source may be an attitude and heading reference module ("AHRM"). In this example, the multi-function display 10 acquires information about the attitude and heading of the aircraft, and presents information indicative of such to the user, in accordance with the configuration file. The heading is the orientation of the aircraft relative to a known location, such as the magnetic north pole of the earth. The attitude is the orientation in space of the aircraft in at least one dimension. The attitude may be relative to a known location such as straight downward (e.g., the direction of the pull of gravity), relative to a hypothetical location such as an artificial horizon, or relative to any other position or orientation helpful for controlling and flying the aircraft. The attitude may also be a measure of the rate of change relative to the known or hypothetical location.

As a seventh example, a source may be rate gyroscopes which indicate rates of change of angles as opposed to indicating direction (as with an angle gyroscope). As such the gyroscopic reading is typically indicative of a rate in which the aircraft is angularly moving in space. A pitch gyroscope may provide an indication of a rate of pitch change of the aircraft (e.g., nose up versus nose down). A yaw gyroscope may provide an indication of a rate of yaw change of the aircraft (e.g., nose left versus nose right). A roll gyroscope may provide an indication of a rate of roll change of the aircraft (e.g., right wingtip up versus right wingtip down). In some embodiments, the gyroscopes may be a solid-state (including microelectromechanical systems ("MEMS")), analog, or laser-ring gyroscope.

As an eighth example, a source may be a set of accelerometers which includes at least one accelerometer configured to measure linear acceleration. In essence, the set of accelerometers measures a direction and magnitude for the pull of gravity on the aircraft (commonly referred to as the "g-force"). In some embodiments of the invention, the set of accelerometers includes a pitch accelerometer, a yaw accelerometer, and a roll accelerometer. The pitch accelerometer measures the force of gravity along a pitch axis (e.g., generally aligned with the wings through the center of gravity of the aircraft, right and left as viewed from the pilot). The yaw accelerometer measures the force of gravity along a yaw axis (e.g., generally vertically through the center of gravity of the aircraft, relative to the static aircraft on the ground, straight up and down as viewed from the pilot). The roll accelerometer measures the force of gravity along a roll axis (e.g., generally horizontally forward through the center of gravity of the aircraft, straight forward and backward as viewed from the pilot). A vector comprising the three readings of the respective accelerometers will therefore point downward, assuming the aircraft is not otherwise accelerating.

As a ninth example, a source may be a set of magnetometers includes at least one magnetometer operable to measure a magnetic force acting upon the aircraft. The magnetic force provides heading information for the aircraft. The set of magnetometers in essence provides a direction toward the magnetic north pole. This allows the aircraft to know its orientation relative to the earth. For example, this allows the multi-function display 10 to adhere to the desired path by determining the orientation of the aircraft relative to magnetic north. In some embodiments, the set of magnetometers includes a pitch magnetometer, a yaw magnetometer, and a roll magnetometer. Each magnetometer in the set of magnetometers is aligned with its respective axis, as are the accelerometers as discussed above.

Although the invention has been described with reference to the exemplary embodiments illustrated in the attached drawings, it is noted that equivalents may be employed and substitutions made herein without departing from the scope of the invention as recited in the claims.

Having thus described various embodiments of the invention, what is claimed as new and desired to be protected by Letters Patent includes the following:

1. A custom function information system compatible for use with an aircraft system, said custom function information system for providing at least one non-certified configuration file including at least one certified output function, the system comprising:
    a communications element;
    a data store storing a first plurality of certified output functions and a second plurality of certified output functions;
    a processor executable by a certified computer program to—
        receive a first non-certified configuration file,
        wherein the first non-certified configuration file comprises a plurality of selection options of the first plurality of certified output functions to be calculated;
        access the first plurality of certified output functions stored in the data store;
        select the at least one certified output function;
        select at least one data source from one or more data sources based on the at least one certified output function selected;
        receive data from the at least one data source;
        calculate the at least one certified output function by a data function processing the received data from the at least one data source,
        wherein the data function is based on the at least one certified output function, and
        receive a second non-certified configuration file,
        wherein the second non-certified configuration file includes information indicative of the second plurality of certified output functions, and
        wherein the second plurality of certified output functions are distinct from the first plurality of certified output functions.

2. The custom function information system of claim 1, wherein the data function is configured to perform at least one of:
    calculating an airspeed, indicating a temperature, determining a pressure, indicating a fuel level, indicating a location, determining an altitude, determining a heading, calculating an engine speed, and determining a rate of change of a data source.

3. The custom function information system of claim 2, wherein the at least one non-certified configuration file is accessed with each powering of the custom function information system and wherein the data function is determined by the at least one non-certified configuration file.

4. The custom function information system of claim 3, wherein the at least one data source is at least one of:
    a computing device, at least one pressure sensor, a thermocouple, a fuel level detection sensor, a location sensor, an altitude and heading reference module, at least one gyroscope, at least one accelerometer, a magnetometer, and an air temperature sensor.

5. The custom function information system of claim 1,
    wherein the at least one certified output function is further configured to customize a display of the at least one certified output function, and
    wherein the customized display is configured by the at least one non-certified configuration file.

6. The custom function information system of claim 5, wherein the display is a peripheral display of an external device communicatively connected to the custom function information system.

7. The custom function information system of claim 1, wherein the at least one non-certified configuration file is based on requirements from a user.

8. The custom function information system of claim 1, wherein the computer program, the first plurality of certified output functions, and the second plurality of certified output functions are certified by the Federal Aviation Administration (FAA) or another administrative or regulatory agency.

9. One or more non-transitory computer-readable media storing aviation certified computer-executable instructions that, when executed by a processor stored on a custom-function device, perform a method of providing at least one certified output function of a plurality of certified output functions based on at least one non-certified configuration file, the method comprising the steps of:
  receiving a first non-certified configuration file,
    wherein the first non-certified configuration file comprises selection options of a first plurality of certified output functions to be calculated;
  accessing the first plurality of certified output functions stored in a data store and selecting the at least one certified output function based on the first non-certified configuration file;
  selecting at least one data source from the one or more data sources based on the at least one certified output function;
  receiving data from the at least one data source;
  calculating the at least one certified output function by a data function processing the received data from the at least one data source,
    wherein the data function is based on the at least one certified output function, and
  receiving a second non-certified configuration file,
    wherein the second non-certified configuration file includes information indicative of a second plurality of certified output functions, and
    wherein the second plurality of certified output functions are distinct from the first plurality of certified output functions.

10. The media of claim 9, wherein the data function performs at least one of:
  calculating an airspeed, indicating a temperature, determining a pressure, indicating a fuel level, indicating a location, determining an altitude, determining a heading, calculating an engine speed, and determining a rate of change of a data source.

11. The media of claim 10, wherein the at least one data source is at least one of:
  a computing device, at least one pressure sensor, a thermocouple, a fuel level detection sensor, a location sensor, an altitude and heading reference module, at least one gyroscope, at least one accelerometer, a magnetometer, and an air temperature sensor.

12. The media of claim 9, wherein the at least one non-certified configuration file is accessed with each powering of the custom function device, and wherein the data function is determined by the at least one non-certified configuration file.

13. The media of claim 9, further comprising:
  customizing a display of the at least one certified output function,
    wherein the customized display is configured by the at least one non-certified configuration file.

14. The media of claim 13, wherein the display is a peripheral display of a device communicatively connected to the custom-function device.

15. The media of claim 9, wherein the at least one non-certified configuration file is created based on requirements from a user.

16. The media of claim 9, wherein the computer-executable instructions, the first plurality of certified output functions, and the second plurality of certified output functions are certified by the Federal Aviation Administration or another administrative or regulatory agency.

17. A multi-function system compatible with an aircraft system for providing at least one output function of a plurality of certified output functions by at least one non-certified configuration file, the system comprising:
  a communications element;
  a data store storing a first plurality of certified output functions and a second plurality of certified output functions;
  one or more non-transitory computer-readable media storing aviation certified computer-executable instructions that, when executed by a processor, perform a method of providing the at least one certified output function of the first plurality of certified output functions by the non-certified configuration file, the method comprising the steps of:
    receiving a first non-certified configuration file,
      wherein the non-certified configuration file comprises a plurality of selection options of the at least one certified output function of the first plurality of certified output functions to be calculated;
    accessing the first plurality of certified output functions stored in a data store and selecting the at least one certified output function based on the non-certified configuration file;
    selecting at least one data source from one or more data sources based on the at least one certified output function;
    receiving data from the at least one data source;
    calculating the at least one certified output function by a data function processing the received data from the at least one data source,
      wherein the data function is based on the at least one certified output function; and
    displaying a customized display of the at least one certified output function,
      wherein the display is customized by the first non-certified configuration file,
    receiving a second non-certified configuration file,
      wherein the second non-certified configuration file includes information indicative of a second plurality of certified outputs functions, and
      wherein the second plurality of certified output functions are distinct from the first plurality of certified output functions.

18. The multi-function system of claim 17, wherein the data function is configured to perform at least one of:
  calculating an airspeed, indicating a temperature, determining a pressure, indicating a fuel level, indicating a location, determining an altitude, determining a heading, calculating an engine speed, and determining a rate of change of a data source.

19. The multi-function system of claim 18, wherein the data source is at least one of:
  a computing device, at least one pressure sensor, a thermocouple, a fuel level detection sensor, a location sensor, an altitude and heading reference module, at least one gyroscope, at least one accelerometer, a magnetometer, and an air temperature sensor.

20. The multi-function system of claim 19,
  wherein the customized display is further displayed on a peripheral display, and
  wherein the computer-executable instructions, the first plurality of certified output functions, and the second plurality of certified output functions are certified by the Federal Aviation Administration.

* * * * *